United States Patent
Luking

[11] Patent Number: 5,841,029
[45] Date of Patent: Nov. 24, 1998

[54] SWING SPEED DEVICE

[75] Inventor: David W. Luking, Louisville, Ky.

[73] Assignee: Dynamis, Inc., Peewee Valley, Ky.

[21] Appl. No.: 771,043

[22] Filed: Dec. 20, 1996

[51] Int. Cl.[6] .............................. G01P 15/00; G01P 1/02
[52] U.S. Cl. .......................................... 73/514.31; 73/493
[58] Field of Search .......................... 73/514.31, 514.39, 73/493; 473/231, 232, 233, 234, 457, 422, 524, 560

[56] References Cited

U.S. PATENT DOCUMENTS

| | | | |
|---|---|---|---|
| 976,176 | 11/1910 | Hollingsworth . | |
| 2,135,648 | 11/1938 | Stumpf | 273/35 |
| 2,592,013 | 4/1952 | Curley | 273/77 |
| 2,780,098 | 2/1957 | Maroth | 73/380 |
| 3,975,018 | 8/1976 | Walker | 473/233 X |
| 4,270,753 | 6/1981 | Maroth et al. | 273/186 |
| 4,317,567 | 3/1982 | Blake | 273/26 |
| 4,363,488 | 12/1982 | Maroth et al. | 273/186 |
| 4,614,343 | 9/1986 | Radway | 273/186 |
| 4,684,133 | 8/1987 | Maroth | 273/186 |
| 4,759,219 | 7/1988 | Cobb et al. | 73/514.39 X |
| 4,788,863 | 12/1988 | Tanaka | 73/493 |
| 4,871,168 | 10/1989 | Autorino et al. | 473/233 X |
| 4,878,672 | 11/1989 | Lukasiewicz | 473/233 |
| 4,967,596 | 11/1990 | Rilling et al. | 73/492 |
| 5,040,418 | 8/1991 | Kushida et al. | 73/514.31 |
| 5,178,394 | 1/1993 | Tanampai | 273/194 |
| 5,334,963 | 8/1994 | Wessling | 73/514.31 X |
| 5,366,222 | 11/1994 | Lee | 273/170 |
| 5,520,049 | 5/1996 | Butler, Jr. | 473/233 X |

*Primary Examiner*—William L. Oen
*Attorney, Agent, or Firm*—Middleton & Reutlinger; James C. Eaves, Jr.

[57] ABSTRACT

A force indicating device for monitoring acceleration forces developed during the motion an object. The device, when attached to a swinging or rotated sports implement, can be used to improve the speed and consistency with which the implement is swung.

The device comprises a housing having a housing bore thereinto, the housing having a magnet at a first end of the housing bore, the magnet having a magnetic field, the housing bore has a first threaded portion therein; a cylinder, the cylinder having a cylinder bore thereinto, the cylinder bore having a magnet end and a second end, the cylinder bore having a movable material therein, the movable material being attractable by the magnet, the cylinder having a second threaded portion external thereto, the cylinder being received at least partways into the housing bore with the magnet end being toward the magnet, the first threaded portion receiving the second threaded portion, the first threaded portion and the second threaded portion permitting the magnet end to be spaced a desired distance from the magnet; and, a strap attached to the housing, the strap permitting the device to be attached to the implement; where the movable material is at the magnet end and retained there by the magnetic field until a user using the implement creates a force which overcomes the magnetic field thereby causing the movable material to move from the magnet end to the second end of the cylinder bore.

20 Claims, 6 Drawing Sheets

SWING SPEED DEVICE

BACKGROUND OF THE INVENTION

1. Field of the Invention

The present invention relates to a force indicating device for monitoring acceleration forces developed during the motion an object. The device, when attached to a swinging or rotated sports implement, can be used to improve the speed and consistency with which the implement is swung.

There exist a need for a swing training device that is versatile, reliable and provides immediate feedback to users. The training device should provide a means for using it with the actual sport implement used during a game. In this way it can be used to help select the correct size and shape sport implement, as well as, to help maximize its use.

2. Discussion of the Prior Art

Previous attempts to develop a simple to use device have been made. U.S. Pat. No. 4,684,133 titled SWING FORCE INDICATOR FOR A PLAYING PIECE OF SPORTS EQUIPMENT seeks to provide a versatile and reliable unit which can be attached to a golf club. It utilizes a ratchet and paw construction for maintaining its speed indicators position after each swing. It falls short in that it does not provide immediate feedback to the user and it must be manually reset before it can be used again.

U.S. Pat. No. 4,614,343 titled GOLF SWING TRAINING DEVICE is composed of a mass held by a spring loaded detente which when released by the swinging motion will give an audible sound and a physical sensation of striking an object. It is however an integral unit containing the mechanism and the handle as a single unit which limits its versatility.

A third concept, taught in U.S. Pat. No. 2,135,648, PRACTICE GOLF CLUB, shows a signal member mounted to a shaft and held by an adjustable means and a remote mounted stop. The device is particularly limited in its versatility to devices with relatively constant diameter shafts. It also requires modifications to the shaft for mounting which also limits its versatility.

An improvement to these concepts would eliminate the need for mechanical linkages which are subject to fail and misalignment while incorporating the flexibility of being used on any sport implement through simple attachment and provide immediate feedback as to the correct action being completed and be very inexpensive to manufacture.

SUMMARY OF THE INVENTION

The present invention is for a modular swing speed indicator which can be attached, without special means, to any rotating object. The device provides an audible signal for immediate feedback when a speed has been reached and provides a simple means to adjust the force required to actuate it. The device is extremely reliable in operation with only one moving part.

More particularly, the present invention comprises an adjustable cylinder, a housing, a resonating plate, a steel mass, a hollow bore cylinder, a magnet, and means of attachment. The hollow bore cylinder is threaded into the housing and is marked with increments on its outside diameter for indicating its relative position in the housing. The hollow bore cylinder has a metal resonating plate covering one end while the other is blocked by a thin non metallic covering. A round steel mass is contained in the hollow cylinder and is free to travel the length of the cylinder bore. Contained in the housing is a magnet held in a fixed location such that when the hollow bore cylinder is fully threaded into the housing the covered non-metallic end will contact the magnet. When in this position the force required to dislodge the mass from the magnetic field is at its maximum. By adjusting the position of the hollow bore cylinder in the base it is possible to change the force required to dislodge the mass. The force to dislodge the mass is derived from a swinging motion. When the mass is launched from the magnetic field it will travel at a high rate of speed until it strikes the resonating plate. At which time an audible click will be heard indicating the device has been tripped. If the device is attached to a rotating object such as a bat, tennis racket, golf club, or held in the hand during a pitching motion, the speed at which the rotating object is moving will be proportional to the force acting on the mass. To reset the device simply tilt it in such a way as to roll the mass back into the magnetic field where it will be held until the next swing.

The invention overcomes the problems associated with mechanical linkages by utilizing a magnet to hold the indicating mass in place. It overcomes the problem of not being widely applicable with immediate feedback by utilizing a resonating plate and small steel mass position close to each other for compactness and robustness. It overcomes the cost barrier by being composed of only one moving part and constructed of molded plastic.

Finally, the present invention comprises a swing speed device for attachment to an implement, including a housing, the housing having a housing bore thereinto, the housing having a magnet at a first end of the housing bore, the magnet having a magnetic field; a cylinder, the cylinder having a cylinder bore thereinto, the cylinder bore having a magnet end and a second end, the cylinder bore having a movable material therein, the movable material being attractable by the magnet, the cylinder being received at least partways into the housing bore, the magnet end being toward the magnet; means for adjusting the cylinder within the housing bore so the magnet end is a desired distance from the magnet; and, means for attaching the housing to the implement; where the movable material is at the magnet end and retained there by the magnetic field until a user using the implement creates a force which overcomes the magnetic field thereby causing the movable material to move from the magnet end to the second end of the cylinder bore.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figures 4, 5:
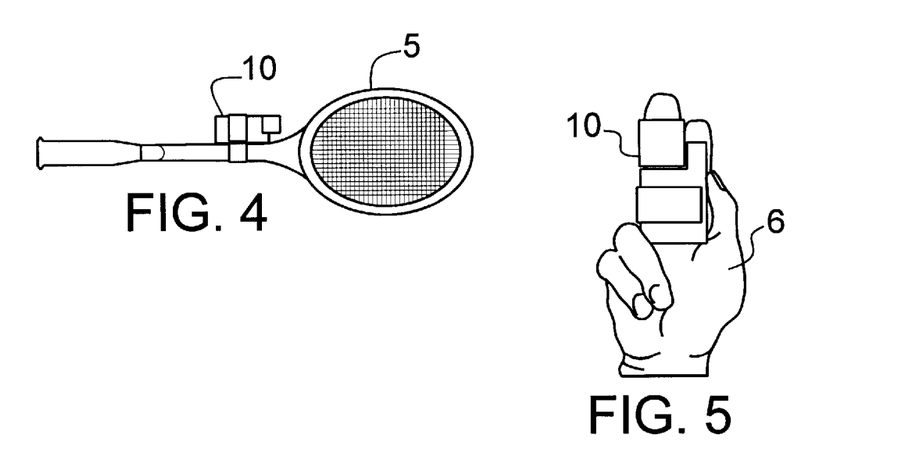
FIG. 4 shows the speed swing device attached to a tennis racket.
FIG. 5 shows the speed swing device attached to a person's hand for simulation of a ball pitching motion.

With reference to FIGS. 1–5, the swing speed device 10 is shown attached to an implement, such as, a golf club 2 (FIG. 1), a ball bat 3 (FIG. 2), a hockey stick 4 (FIG. 3), a tennis racket 5 (FIG. 4), and to a person's hand 6 (FIG. 5). The device 10 includes a magnet 12 and a steel ball 14, shown in FIG. 8. The ball 14 is spaced a desired distance from the magnet 12, leaving an air gap therebetween. Given the magnetic holding properties of the magnet 12, the weight and metallic properties of the ball 14, and the spacing therebetween, it will take a determinable force to have the ball 14 move away from the holding force of the magnet 12. If a person, swinging golf club 2, bat 3, hockey stick 4, or tennis racket 5, or practicing a pitching motion with hand 6 exceeds this determinable force, the ball 14 will fly away from the magnet 12 and hit a resonating plate 16 causing an audible sound alerting the user that he has met his desired "swing speed". Instead of resonating plate 16, an electronic notification means can be employed to provide notice to the user. For example, ball 14 could engage a switch which would then create an audible, visible, or other alert indicator. By adjusting the initial spacing of the gap between the ball 14 and the magnet 12, the user can train for any desired swing or throwing speed.

Figure 7:
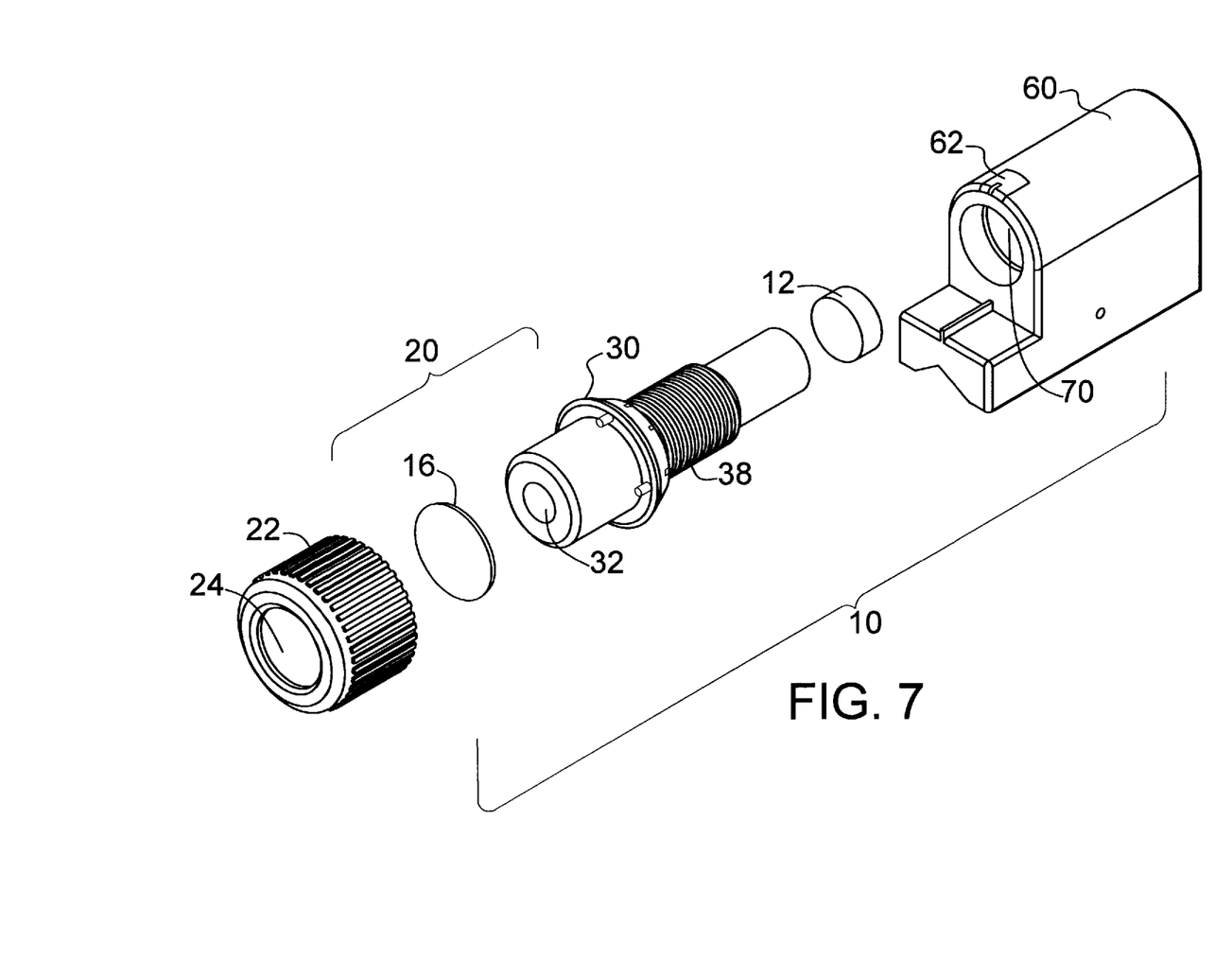
FIG. 7 is an exploded perspective view of the speed swing device of the preferred embodiment.

The preferred embodiment of the device 10 for use with baseball bat 3 is as follows. The device 10 has three major components—a cylinder 20, a housing 60, and a mounting strap 80. The cylinder 20 includes a fluted cap 22, the previously mentioned spring steel resonating plate 16 and steel ball 14, steel ball 14 received within hollow bore 32 of threaded hollow bore cylinder 30.

Figure 8:
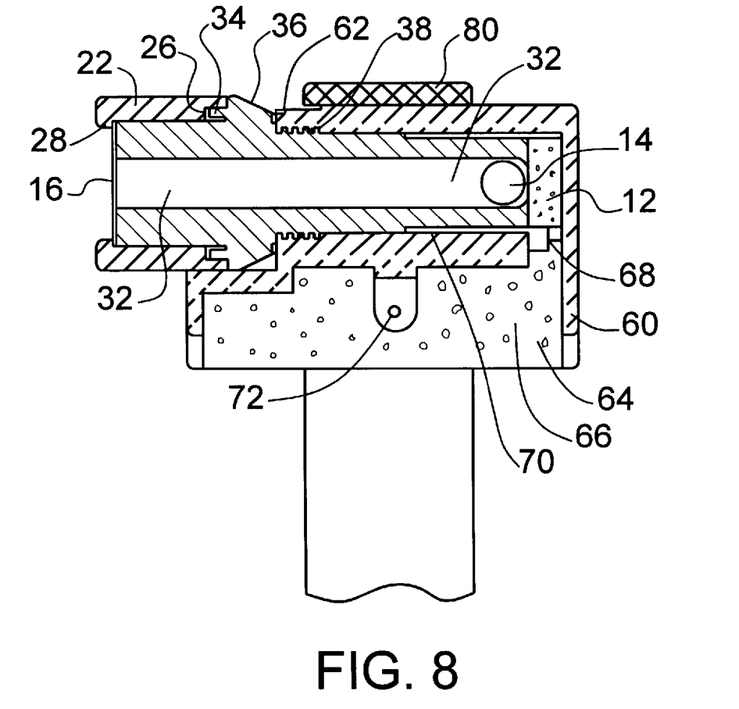
FIG. 8 is a cross-sectional view of the speed swing device of FIG. 6.

Diameters of ball 14 and bore 32 will correlate such that the ball 14 can move axially with ease within bore 32. For example, ball 14 could be 0.25 inch (0.635 cm) in diameter and bore 32 could have a diameter just slightly larger, for example 0.30 inch (0.847 cm). Larger or smaller balls could be used, as desired. The ball will be selected so that it and the previously mentioned magnet 12 will have desired interaction characteristics.

The resonating plate 16 is pressed into a center opening 24 of the fluted cap 22 with an 0.005 inch (0.0127 cm) interference fit. The fluted cap 22 is permanently glued to the hollow bore cylinder 30 using a solvent type cement applied to the 4 pegs 34 which are received by mating bores 26 in fluted cap 22. Fluted cap 22 has a lip 28 to retain the plate 16 within the cap 22 on the end opposite the cylinder 30.

The steel ball 14 is placed in bore 32 of the hollow bore cylinder 30 before the fluted cap 22 with plate 16 therein is glued into place on cylinder 30. Ball 14 is placed into the open end of bore 32 which is the end which will be nearest the plate 16. The other end of bore 32 is at least partway closed, in that any opening at that end will be of smaller dimensions that the dimension of the steel ball 14. If desired, a small opening can be provided at this end to ensure that ball 14 can easily move either way within bore 32, except as restricted by previously mentioned magnet 12.

Figure 6:
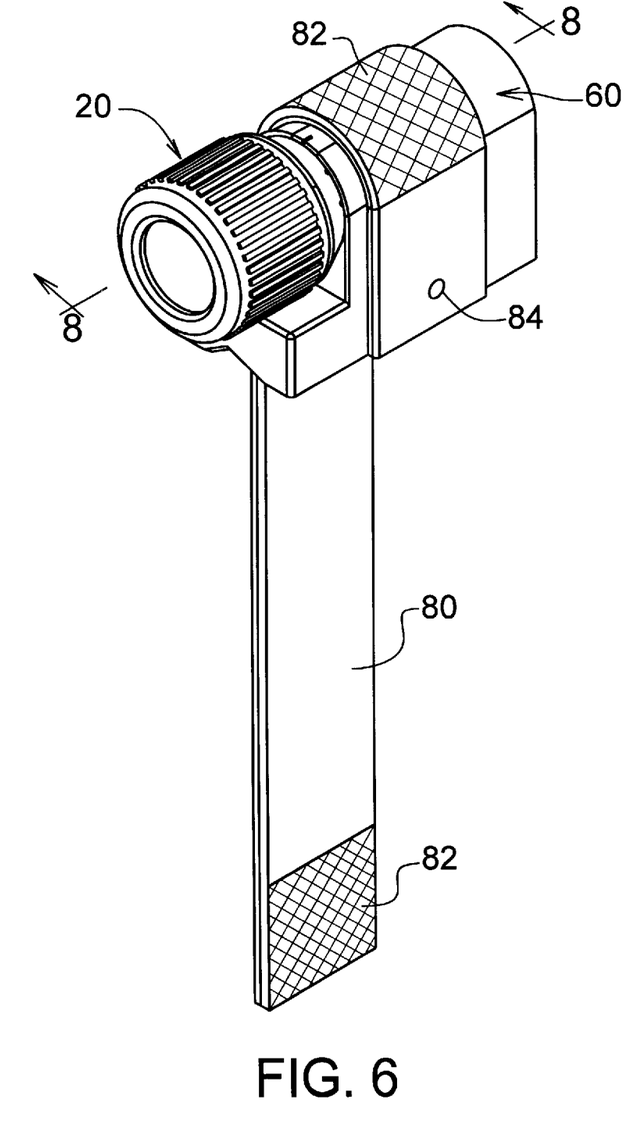
FIG. 6 is a perspective view of the speed swing device of the preferred embodiment.

The cylinder 30 has numbered increments 36 on its outer diameter. For example, the numbers and increments can be filled with white paint for easier visibility by the user. These numbered increments 36 and corresponding notches 62 on housing 60 are used to place the ball 14 a desired distance from magnet 12 so that a predetermined swing force will be required to cause the ball 14 to break the "hold" of magnet 12 and move down the bore 32 and strike the plate 16, thereby making an audible sound to alert the user that he has swung at at least the desired speed. By tilting the device 10 and resetting the ball 14 at the at least partways closed end of bore 32, swings can be repeated so that the user develops a consistent swing. With the ball 14 closer to magnet 12, a harder swing is required to break the magnetic hold. Likewise, with the ball 14 further from magnet 12, an easier swing is required to break the magnetic hold.

Cylinder 30 contains a partways threaded cylinder portion 38 to be received into housing 60. For example, threads can be 18 per inch (2.54 cm) and cylinder portion 38 can have a diameter of ⅝ inch (1.588 cm) at the threads.

The housing 60 is preferably made of injection molded plastic and contains previously mentioned magnet 12 and foam pad 64. The magnet 12 is inserted through an opening 66 in the bottom of the housing 60 and held in place by the two mold projections 68. The foam pad 64 is then glued into the opening 66. The foam pad 64 is preferably, for example, a 4 pound density foam.

Housing 60 has a partways threaded cylinder receiving bore 70, the threaded portion mating threads 38 on cylinder 30. Cylinder 30 is threaded in or out of housing 60 to set the desired spacing between magnet 12 and ball 14, increments 36 and notch 62 being used to know when the desired spacing is achieved. It is noted that cylinder 30 and cylinder receiving bore 70 do not have to be circular. For example, a member of square cross-section could replace cylinder 30 and it would be received in a square-shaped bore and slid in or out to adjust the spacing between the ball 14 and magnet 12.

The strap 80 is preferably a one inch (2.54 cm) wide polypropylene, nine inches (22.86 cm) long, with hook and loop connectors 82 sew toward each end. The hook and loop connectors 82 are oriented so as to engage each other when, for example, the strap 80 is wrapped around the handle of bat 3. As seen in FIG. 6, at housing 60, connector 82 is on the opposite side of strap 80 from the housing 60; while, at the other end of the strap 80, connector 82 is on the opposite side of strap 80. The strap 80 is wrapped over the housing 60 and attached thereto using two opposed drive rivets 82 into bores 72. Other attaching means can be employed instead of hook and loop connectors. For example, a clip could be used so that the strap 80 is placed around the implement and looped through the clip to retain the device in the desired location. For permanent use on a bat, for example, the device could even be permanently attached to the bat, by a screw or by a clamp. Any attachment means which will securely affix the device on the implement so that it will not move during use will be satisfactory.

Figure 1:
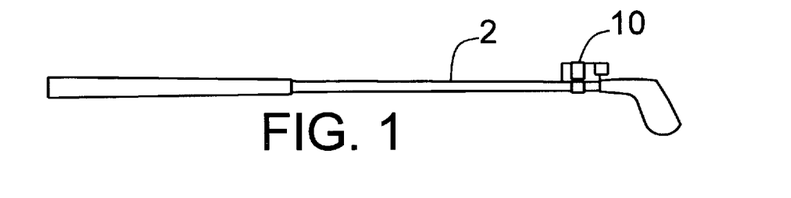
FIG. 1 shows the speed swing device attached to a golf club.
Figure 2:
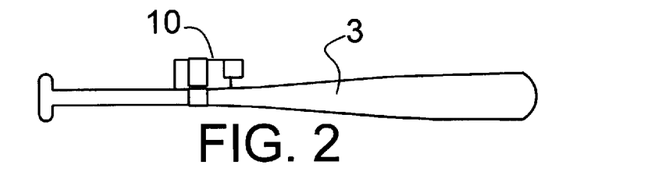
FIG. 2 shows the speed swing device attached to a ball bat.
Figure 3:
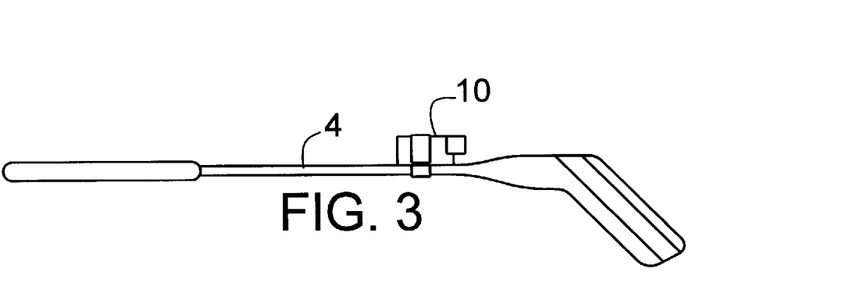
FIG. 3 shows the speed swing device attached to a hockey stick.

To use the device 10 with a bat 3, it is preferred that the device 10 be attached to the bat 3 one hand grip above the user's normal grip position. To do this, release the engaging hook and loop connectors 82 of strap 80, grasp the bat 3 next to the knob with one hand (hand A). Use the other hand (hand B) and grasp the bat 3 just above hand A, release hand A and grasp the bat just above hand B, release hand B. You are now be holding the bat three hand grips above the knob.

Place the device 10 onto the bat just above hand A. The foam base 64 should be against bat handle and fluted cap 22 pointed up the bat barrel away from the knob. Now wrap the strap 80 around the bat handle tightly and use hook and loop connectors 82 to secure device 10 on bat 3 at this desired location.

To initially use the device 10, turn the fluted cap 22 in a first direction (typically clockwise) to screw cylinder 30 into the housing 60 as far as it will go, thereby positioning the ball 14 as close to magnet 12 as possible. Then, back it out approximately 4 full turns by turning fluted cap 22 in the direction opposite the first direction (second direction, usually counter-clockwise). Swing the bat 3 and listen for a "click", the audible sound of ball 14 hitting plate 16. Reset the device 10 by holding the bat 3 straight up, that is with the barrel up and knob down. The ball 14 will return to the closest position to magnet 12 permitted by bore 32. Adjust the knob inward some amount, from 4 rotations out, by turning fluted cap 22 in the first direction and swing the bat 3 again. Continue this process until you can no longer swing and hear a click. Back the knob out two marks by turning fluted cap 22 in the second direction (using increments 36 and notch 62 as an indication) and swing again. You should again hear the click. Swing the bat 3 several times to insure you can consistently activate the unit. You are now ready to begin.

Note your setting, for example 2.7 turns out, using increments 36 and notch 62. Swing the bat 3 fifteen times and note how many times you hear the click. When you can hear the click every time, you are ready to decrease the setting by one increment. Each time you reach 15 consecutive swings decrease the setting. By doing so, the user can use the device 10 to achieve a desired bat swing speed and can know that he can achieve that swing speed repeatedly. The device 10 is similarly used with other sporting implements, such as, for example, cricket bats, hockey sticks, golf clubs, tennis rackets, etc. Further, as shown in FIG. 5, a pitcher can attach the device 10 to his fingers and practice his throwing motion.

Figure 9:
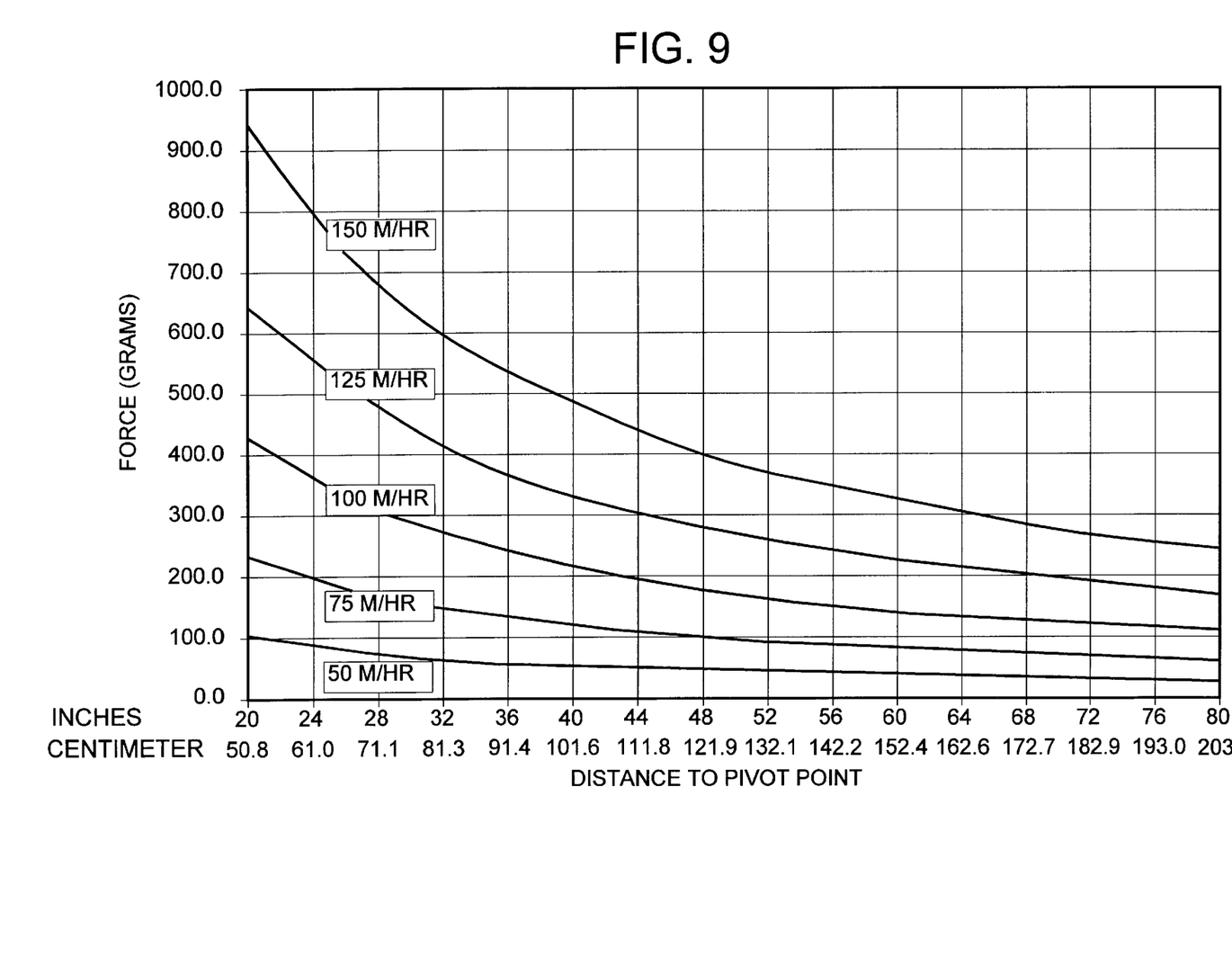
FIG. 9 is a graphical representation of centrifugal force generated at various speeds by rotating 0.25 inch (0.635 cm) diameter steel ball at various distances from a pivot point; and, FIG. 10 is a graphical representation of the holding force developed between a 0.50 inch (1.37 cm) diameter by 0.20 inch (0.508 cm) thick Neodymium magnet, grade 27 MGO, and a 0.25 inch (0.635 cm) diameter steel ball.
Figure 10:
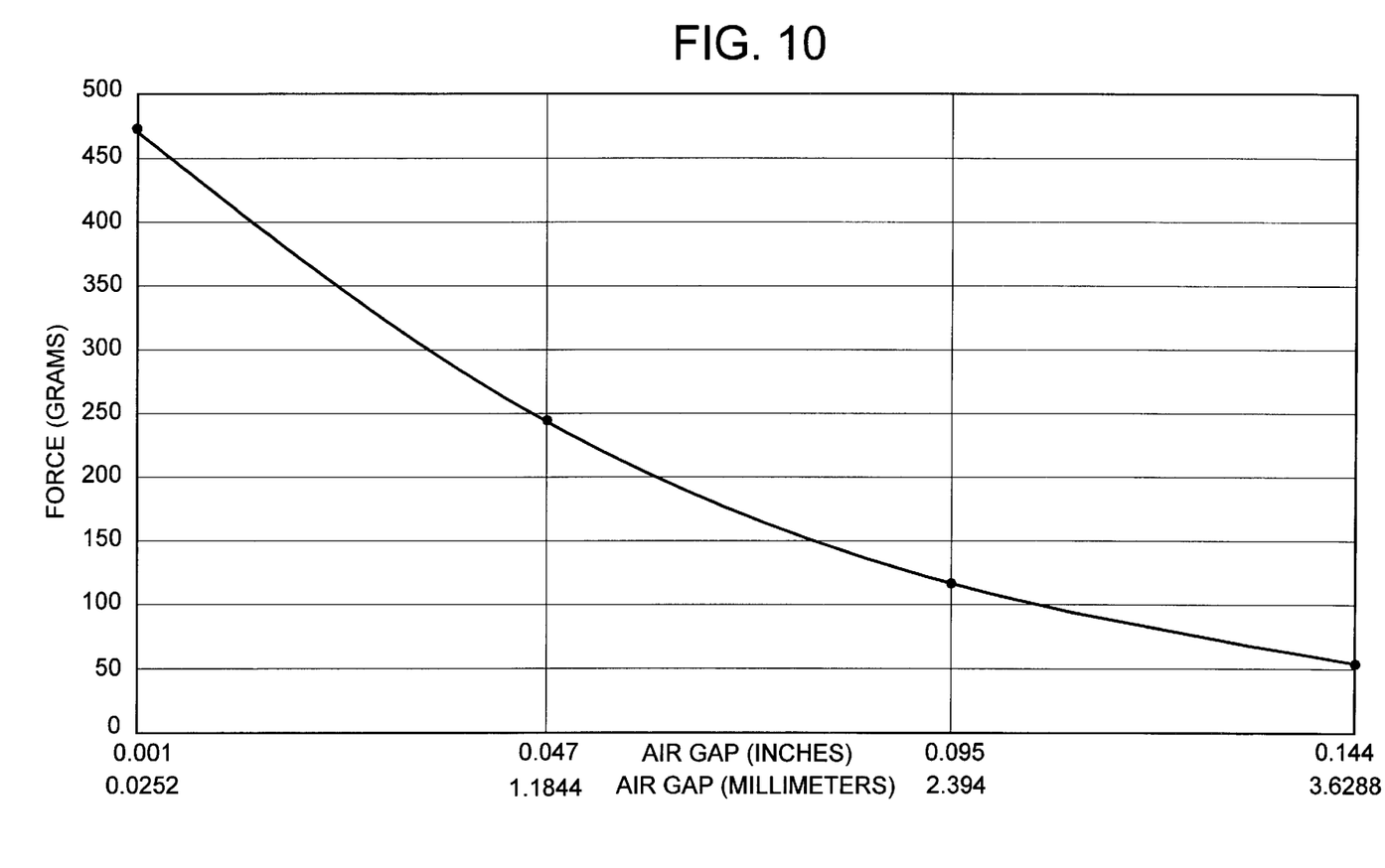

FIGS. 9 and 10 provide graphical representations of how the device 10 works. A 0.25 inch (0.635 cm) steel ball 14 typically weight about 0.04 ounces (1.13 grams). In swinging a bat 3, or other item, the ball 14 is going to be some distance from the pivot point of the swing. FIG. 9 displays, for various bat swing speeds, the centrifugal force generated, using the equation force equals mass times velocity squared divided by the radius. For example, if ball 14 is 20 inches (50.8 cm) from the pivot point, and the bat, at the location of ball 14, is swung at 100 miles per hour, a centrifugal force of about 425 grams is achieved.

FIG. 10 demonstrates for that same steel ball 14, how much force is required for the ball 14 to escape the hold of magnet 12 at various air gaps between ball 14 and magnet 12. This data was determined by establishing a mass at a selected distance from the magnet 12 and increasing the mass until it overcame the magnetic force at that distance from the magnet. For example, with the 100 mile per hour swing (and 425 grams centrifugal force achieved), if the air gap between the ball 14 and magnet 12 is 0.001 inch (0.002 cm), the 425 grams is not sufficient to break the hold of about 475 grams. If the gap is increased to 0.023 inch (0.058 cm), the 425 grams exceeds the approximately 360 grams required to break the magnetic hold on ball 14.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:
1. A swing speed device for external attachment to an implement, comprising:
   a. a housing, said housing having a housing bore thereinto, said housing having a magnet at a first end of said housing bore, said magnet having a magnetic field;
   b. a cylinder, said cylinder having a cylinder bore thereinto, said cylinder bore having a magnet end and a second end, said cylinder bore having a movable material therein, said movable material being attractable by said magnet, said cylinder being received at least partways into said housing bore, said magnet end being toward said magnet;
   c. means for adjusting said cylinder within said housing bore so said magnet end is a desired distance from said magnet; and,
   d. means for attaching said housing to the implement;
   e. where said movable material is at said magnet end and retained there by said magnetic field until a user using the implement creates a force which overcomes said magnetic field thereby causing said movable material to move from said magnet end to said second end of said cylinder bore.

2. The swing speed device of claim 1, where said movable material is a steel ball.

3. The swing speed device of claim 1, further comprising means for notifying said user when said movable material has moved to said second end of said cylinder bore.

4. The swing speed device of claim 3, where said notifying means comprises a spring steel resonating plate retained at said second end of said cylinder bore, said movable material striking said plate thereby creating an audible sound.

5. The swing speed device of claim 4, where said movable material is a steel ball.

6. The swing speed device of claim 1, where said adjusting means comprises a first threaded portion internal to said housing bore and a second threaded portion external to said cylinder, said first threaded portion receiving said second threaded portion, thereby allowing said cylinder to be threaded within said housing bore.

7. The swing speed device of claim 6, further comprising means for identifying how far said magnet end of said cylinder is from said magnet.

8. The swing speed device of claim 7, where said identifying means comprises a plurality of calibration increments on said cylinder and a corresponding notch on said housing.

9. The swing speed device of claim 7, further comprising means for notifying said user when said movable material has moved to said second end of said cylinder bore.

10. The swing speed device of claim 9, where said notifying means comprises a spring steel resonating plate retained at said second end of said cylinder bore, said movable material striking said plate thereby creating an audible sound.

11. The swing speed device of claim 10, where said movable material is a steel ball.

12. The swing speed device of claim 1, where said attaching means comprises a strap attached to said housing, said strap having hook and loop connectors thereon; where, when said device is attached to the implement, said hook and loop connectors are mated to retain said device on the implement at a desired location.

13. A swing speed device for attachment to an implement, comprising:
   a. a housing, said housing having a housing bore thereinto, said housing having a magnet at a first end of said housing bore, said magnet having a magnetic field, said housing bore has a first threaded portion therein;

b. a cylinder, said cylinder having a cylinder bore thereinto, said cylinder bore having a magnet end and a second end, said cylinder bore having a movable material therein, said movable material being attractable by said magnet, said cylinder having a second threaded portion external thereto, said cylinder being received at least partways into said housing bore with said magnet end being toward said magnet, said first threaded portion receiving said second threaded portion, said first threaded portion and said second threaded portion permitting said magnet end to be spaced a desired distance from said magnet; and, d. a strap attached to said housing, said strap permitting said device to be attached to the implement;

e. where said movable material is at said magnet end and retained there by said magnetic field until a user using the implement creates a force which overcomes said magnetic field thereby causing said movable material to move from said magnet end to said second end of said cylinder bore.

14. The swing speed device of claim 13, where said movable material is a steel ball.

15. The swing speed device of claim 14, further comprising a spring steel resonating plate retained at said second end of said cylinder bore, said resonating place creating an audible sound when said steel ball engages said resonating plate.

16. The swing speed device of claim 15, further comprising a plurality of calibration increments on said cylinder and a corresponding notch on said housing, where said calibration increments and said notch identify how far said magnet end of said cylinder is from said magnet.

17. A swing speed device for external attachment to an implement, comprising:

a. a housing, said housing having a housing bore thereinto, said housing having a magnet at a first end of said housing bore, said magnet having a magnetic field;

b. a member, said member having a member bore thereinto, said member bore having a magnet end and a second end, said member bore having a movable material therein, said movable material being attractable by said magnet, said member being received at least partways into said housing bore, said magnet end being toward said magnet;

c. means for adjusting said member within said housing bore so said magnet end is a desired distance from said magnet; and, d. means for attaching said housing to the implement;

e. where said movable material is at said magnet end and retained there by said magnetic field until a user using the implement creates a force which overcomes said magnetic field thereby causing said movable material to move from said magnet end.

18. The swing speed device of claim 17, where said movable material is a steel ball.

19. The swing speed device of claim 17, further comprising a spring steel resonating plate retained at said second end of said member bore.

20. The swing speed device of claim 19, further comprising a plurality of calibration increments on said member and a corresponding notch on said housing, where said calibration increments and said notch identify how far said magnet end of said member is from said magnet.

* * * * *